United States Patent
Tutel et al.

(10) Patent No.: US 11,313,265 B2
(45) Date of Patent: Apr. 26, 2022

(54) EXHAUST GAS POST-TREATMENT DEVICE

(71) Applicant: FAURECIA SYSTEMES D'ECHAPPEMENT, Nanterre (FR)

(72) Inventors: Clémentine Tutel, Audincourt (FR); Julien Moulieres, Montbeliard (FR)

(73) Assignee: FAURECIA SYSTEMES D'ECHAPPEMENT

(*) Notice: Subject to any disclaimer, the term of this patent is extended or adjusted under 35 U.S.C. 154(b) by 0 days.

(21) Appl. No.: 16/907,585

(22) Filed: Jun. 22, 2020

(65) Prior Publication Data

US 2020/0408123 A1    Dec. 31, 2020

(30) Foreign Application Priority Data

Jun. 26, 2019   (FR) ..................... 19 06950

(51) Int. Cl.
| | |
|---|---|
| *F01N 3/00* | (2006.01) |
| *F01N 3/20* | (2006.01) |
| *F01N 3/28* | (2006.01) |
| *B01F 23/213* | (2022.01) |
| *B01F 25/314* | (2022.01) |
| *F01N 3/08* | (2006.01) |

(52) U.S. Cl.
CPC .......... *F01N 3/208* (2013.01); *B01F 23/2132* (2022.01); *B01F 25/31423* (2022.01); *F01N 3/2892* (2013.01); *B01F 2215/0431* (2013.01); *B01F 2215/0472* (2013.01); *F01N 3/0842* (2013.01); *F01N 2610/02* (2013.01); *F01N 2610/1453* (2013.01); *F01N 2900/1404* (2013.01)

(58) Field of Classification Search
CPC ............... F01N 3/208; F01N 3/2892; F01N 2610/1453; B01F 3/04049; B01F 5/048; B01F 2215/0431
USPC ............................................ 60/282
See application file for complete search history.

(56) References Cited

U.S. PATENT DOCUMENTS

| | | | |
|---|---|---|---|
| 5,199,255 A | 4/1993 | Sun et al. | |
| 6,622,944 B1 * | 9/2003 | Hurley | F23D 11/102 239/426 |

(Continued)

FOREIGN PATENT DOCUMENTS

| | | |
|---|---|---|
| DE | 102011076467 A1 | 11/2012 |
| DE | 102017007863 A1 | 2/2019 |

(Continued)

OTHER PUBLICATIONS

French Preliminary Research Report dated Feb. 19, 2020.
Chinese Search Report dated Oct. 28, 2021 for application No. 202010594301.7.

*Primary Examiner* — Jason D Shanske
(74) *Attorney, Agent, or Firm* — Carlson, Gaskey & Olds, P.C.

(57) ABSTRACT

An exhaust gas post-treatment device for an internal combustion engine mixes exhaust gas with a reducing agent. The exhaust gas post-treatment device comprises a mixing chamber through which the exhaust gas circulates and a reducing agent sprayer that sprays a reducing agent in the mixing chamber. The reducing agent sprayer comprises at least one first nozzle and at least one second nozzle, where said at least one first nozzle is designed to produce small droplets, and said at least one second nozzle is designed to produce large droplets.

7 Claims, 2 Drawing Sheets

(56) References Cited

U.S. PATENT DOCUMENTS

| | | | |
|---|---|---|---|
| RE40,886 E * | 9/2009 | Sugimoto | F02M 61/1806 239/533.12 |
| 8,528,884 B2 * | 9/2013 | Maus | F01N 3/2066 261/118 |
| 2005/0000220 A1 * | 1/2005 | Zauderer | B01D 53/56 60/775 |
| 2012/0156105 A1 | 6/2012 | Maus et al. | |
| 2015/0121855 A1 | 5/2015 | Munnannur et al. | |
| 2015/0314238 A1 | 11/2015 | Gerhart et al. | |
| 2016/0090887 A1 * | 3/2016 | Mitchell | F01N 3/208 60/274 |
| 2020/0347767 A1 * | 11/2020 | El-Gammal | B01F 5/0065 |

FOREIGN PATENT DOCUMENTS

| | | |
|---|---|---|
| KR | 1020120047957 A | 5/2012 |
| SE | 1150948 A1 | 5/2013 |
| WO | 2019025860 A1 | 2/2019 |

* cited by examiner

EXHAUST GAS POST-TREATMENT DEVICE

CROSS REFERENCE TO RELATED APPLICATIONS

This application is a U.S. non-provisional application claiming the benefit of French Application No. FR 19 06950, filed on Jun. 26, 2019, which is incorporated herein by its entirety.

TECHNICAL FIELD

The present disclosure relates to the technical field of reduction mixers. A reduction mixer is a device located at an outlet of an internal combustion engine and the function of which is to mix a reducing agent, such as a urea solution, called AdBlue or DEF, with the exhaust gas, to clean said exhaust gas by reducing the NOx contained in the exhaust gas.

BACKGROUND

It is known to position a mixing chamber in an exhaust line. The exhaust gas flows through this mixing chamber. At least one nozzle is positioned in said mixing chamber to spray the reducing agent in said mixing chamber and in said stream of exhaust gas. The produced spray comprises droplets of reducing agent to mix with said exhaust gas.

According to factors such as the temperature and/or the mass flow of exhaust gas, the mixing may not be satisfactory. Either the spraying is not strong enough to pass all the way through the gas flow and thus does not provide enough reducing agent or does not do so homogeneously enough, or the spraying is too strong and may see the reducing agent reach an opposite wall of the chamber where it may be deposited. Such a deposit is detrimental in that once it is deposited, the reducing agent may find it difficult to evaporate and then remains deposited instead of mixing with the exhaust gas. Additionally, the deposit may have contrary effects on the mixing and the pressure drop of the exhaust system.

US20170191393 discloses the use of two nozzles, where each nozzle is located in a separate mixing chamber.

WO2018190843 discloses a first main nozzle, operating continuously, and a second auxiliary nozzle that may provide assistance if needed. In the absence of additional information, the two nozzles appear to be identical.

US20160090887 discloses two nozzles. These nozzles are "strong" nozzles in that they both lead to reducing agent deposits. The two nozzles are used alternatively to give time for each corresponding reducing agent to evaporate, when its nozzle is no longer operating. In the absence of additional information, the two nozzles appear to be identical.

None of these proposals are fully satisfactory. The disclosure therefore proposes a different solution not having the drawbacks of these proposals, while resolving all of the mixing problems.

SUMMARY

The disclosure relates to an exhaust gas post-treatment device for an internal combustion engine that mixes the exhaust gas with a reducing agent. The exhaust gas post-treatment device comprises a mixing chamber through which the exhaust gas circulates and a reducing agent sprayer configured to spray a reducing agent in the mixing chamber, said reducing agent sprayer comprising at least one first nozzle and at least one second nozzle, where said at least one first nozzle is designed to produce small droplets and said at least one second nozzle is designed to produce large droplets.

Other features or embodiments, which may be used alone or in combination, are:
- said at least one first nozzle is primarily used when the energy of the exhaust gas is low and said at least one second nozzle is primarily used when the energy of the exhaust gas is high,
- said at least one first nozzle is used according to a decreasing function of the energy of the exhaust gas and said at least one second nozzle is used according to an increasing function of the energy of the exhaust gas,
- said at least one first nozzle is located in a location of the mixing chamber that is more sensitive to deposit formation and said at least one second nozzle is located in a location of the mixing chamber that is less sensitive to deposit formation,
- said at least one first nozzle is located in a narrow zone of the mixing chamber where the opposite wall is closer and said at least one second nozzle is located in a broader zone of the mixing chamber,
- a small droplet has an average Sauter diameter of between 10 and 30 μm, preferably equal to 20 μm, and a large droplet has an average Sauter diameter of between 40 and 70 μm, preferably equal to 55 μm,
- a low energy corresponds to a temperature of between 180° C. and 300° C. and a high energy corresponds to a temperature of between 300° C. and 500° C.

BRIEF DESCRIPTION OF THE DRAWINGS

The disclosure will be better understood in light of the following description, provided solely as an illustration, and in reference to the appended figures, in which.

DETAILED DESCRIPTION

Figure 1:
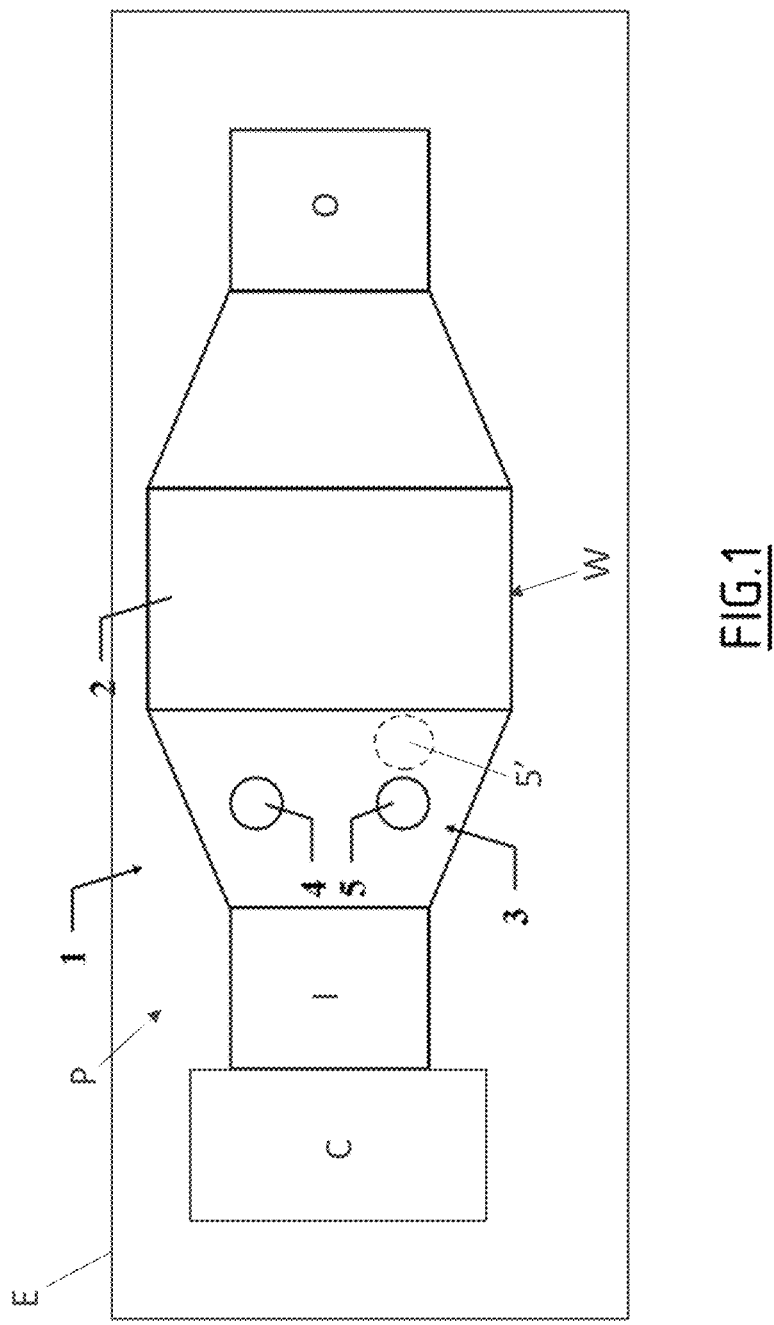
FIG. 1 shows an exhaust gas post-treatment device according to the disclosure in a sectional view taken along the axis of the exhaust line.

FIG. 1 shows an exhaust gas post-treatment device 1 according to the disclosure. This post-treatment device 1 is incorporated into an exhaust pipe P of an internal combustion engine E, typically after/downstream from a catalytic device C. The post-treatment device 1 comprises a mixing chamber 2. The exhaust gas enters the mixing chamber 2 through an inlet I, here on the left, and leaves the mixing chamber 2 through an outlet O, here on the right, thus circulating through the mixing chamber 2. The post-treatment device 1 further comprises a reducing agent sprayer 3, typically located in a wall W of said mixing chamber 2 in order to be capable of spraying reducing agent in the mixing chamber 2 and thus through the circulating exhaust gas. This reducing agent sprayer 3 typically comprises a pump for pressurizing the reducing agent and at least one metering device able to deliver a given quantity of reducing agent. To that end, each metering device can, for example, comprise a needle actuator for controlling the reducing agent metering. Alternatively, the metering can be done by the pump. The post-treatment device 1 comprises at least one first metering device and at least one second metering device, each metering device comprising a nozzle at its end. The post-treatment device 1 thus comprises at least one first nozzle 4 and at least one second nozzle 5. According to one feature, said at least one first nozzle 4 is designed to produce small droplets and said at least one second nozzle is designed to produce large droplets.

The small droplets are advantageously more subject to evaporation and thus mix more easily with the exhaust gas stream. Additionally, because the small droplets have a low inertia, they are less capable of reaching the opposite wall of the mixing chamber 2 and thus do not encroach on this opposite wall and do not form harmful deposits. However, it is more difficult to deliver a large quantity of reducing agent by using small droplets. Additionally, because the small droplets have a low inertia, they are less capable of reaching the part of the exhaust gas stream furthest from the nozzle, potentially leading to nonhomogeneous mixing.

The large droplets have the opposite advantages and drawbacks. They have a greater inertia and are thus more able to pass through the exhaust gas stream and to produce homogeneous mixing. However, this greater inertia increases the risk of encroachment and deposition. A greater quantity of sprayed reducing agent leads to a production of larger droplets, which means more difficult evaporation and a reduced mixing capacity.

According to another feature, in agreement with the advantages and drawbacks previously described, said at least one first nozzle 4 is primarily used when the energy of the exhaust gas is low and said at least one second nozzle 5 is primarily used when the energy of the exhaust gas is high.

The energy of the exhaust gas is coupled with the temperature and the mass flow. For simplicity, it is observed by monitoring the temperature.

When the temperature is low, the evaporation is slowed. When the mass flow is low, the risk of encroachment/deposit is increased while the quantity of reducing agent necessary is decreased. These specifications are in accordance with a nozzle with small droplets.

On the contrary, when the temperature is high, the evaporation is accelerated, improving the mixing, including of large droplets, and reducing the consequences of deposits. When the mass flow is high, the risk of encroachment/deposit is decreased while the quantity of reducing agent necessary is increased. These specifications are in accordance with a nozzle with large droplets.

Figure 2:
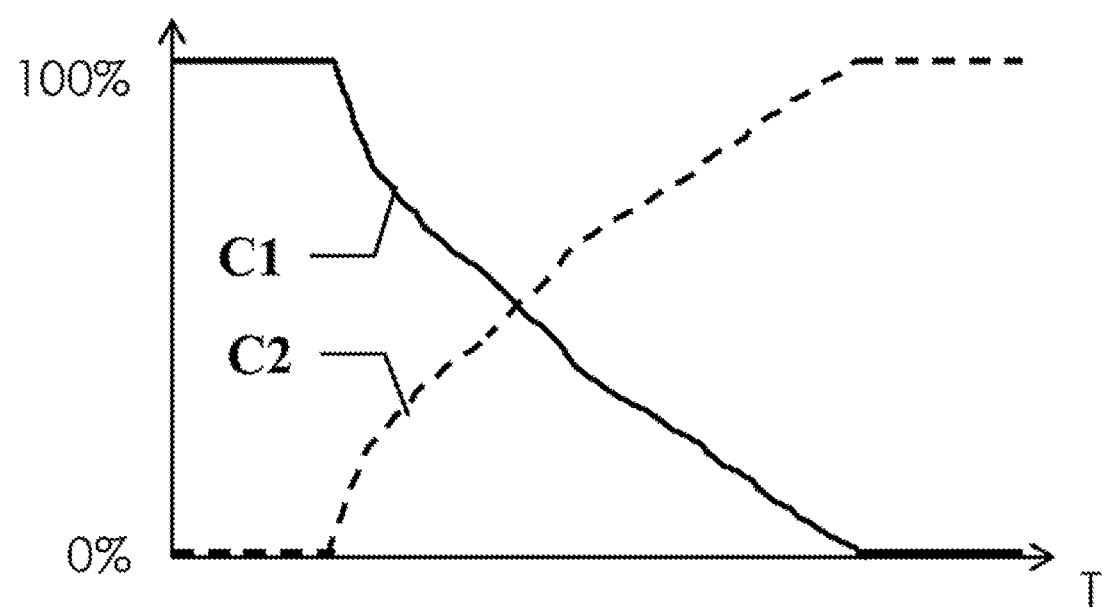
FIG. 2 shows one possible control law for the respective nozzles.

According to another advantageous feature, the two nozzle types are done in a coordinated manner: said at least one first nozzle 4 is used according to a decreasing function of the energy of the exhaust gas, while said at least one second nozzle 5 is used according to an increasing function of the energy of the exhaust gas. FIG. 2 shows an embodiment of this feature: in a diagram showing the energy/temperature T (and/or the mass flow) of the exhaust gas on the x-axis and a relative usage rate of a nozzle on the y-axis, curve C1 indicates the commanded usage rate of a first nozzle 4 (small droplets) and curve C2 indicates the commanded usage rate of a second nozzle 5 (large droplets). It can be seen that at low energy, the first nozzle 4 is used alone, while at high energy, the second nozzle 5 is used alone. In the interval, the rate of the first nozzle decreases continuously, while the rate of the second nozzle increases continuously, in a complementary manner.

Each nozzle can be controlled as a function of the energy characterized by the temperature of the exhaust gas. The temperature can be measured, for example, by a temperature sensor positioned in the exhaust line. Alternatively, the temperature can be supplied by the engine control unit or any other unit.

Obviously, both types of nozzles are operated in a coordinated manner such that the cumulative quantity of reducing agent distributed in the mixing chamber 2 by all of the nozzles is equal to the total quantity necessary in order to reduce the NOx transported by the exhaust gas, said quantity being determined in a known manner as a function of the mass flow and the quantity of NOx of the exhaust gas at the outlet of the engine.

A nozzle is a part comprising a calibrated bore. The size of the droplets leaving a nozzle can be directly connected to the diameter of this bore, for a given viscosity and reducing agent pressure.

Rather than using two nozzles, one for small droplets and one for large droplets, it has been considered to use a single variable nozzle making it possible to vary the size/diameter of its bore to vary the size of the droplets. This solution was rejected due to the complexity of such a variable nozzle. Two nozzles of fixed size, with different sizes, including with the addition of a variable distributor in order to vary the distribution of reducing agent between said two nozzles, appears to be simpler and more robust. Additionally, two nozzles have an advantage relative to just one: they can be positioned independently in different zones of a mixing chamber 2, each according to its own constraints. Thus, for example, a nozzle 4 with small droplets can be installed in a location that is more sensitive to deposit formation, for example in a narrower zone of the mixing chamber 2 where the opposite wall is closer. The small droplets evaporate more quickly, and the inertia being lower, the risk of encroachment as well as deposit formation would be reduced. The nozzle 5' with large droplets, conversely, can be installed in a location that is less sensitive to deposit formation, for example in a larger zone of the mixing chamber 2.

A nozzle sprays a reducing agent in the form of droplets with different sizes distributed according to a substantially Gaussian distribution. Such a distribution is typically characterized by a single mean number, for example a Sauter Mean Diameter (SMD).

On this basis, a small droplet has an average Sauter diameter advantageously of between 10 and 30 µm, preferably equal to 20 µm, and a large droplet has an average Sauter diameter advantageously of between 40 and 70 µm, preferably equal to 55 µm.

According to one advantageous feature, a low energy corresponds to a temperature of between 180° C. and 300° C. and a high energy corresponds to a temperature of between 300° C. and 500° C.

The disclosure has been described in detail in the preceding description in reference to the attached figures. This description must be considered to be illustrative and provided as an example, and the disclosure cannot be considered to be limited to this description alone. Many embodiment variants are possible.

LIST OF REFERENCE SIGNS

1: post-treatment device,
2: mixing chamber,
3: reducing agent sprayer,
4: small droplet/first nozzle,
5: large droplet/second nozzle,

The invention claimed is:
1. An exhaust gas post-treatment device for an internal combustion engine, and for mixing exhaust gas with a reducing agent, comprising:

a mixing chamber through which the exhaust gas circulates;

a reducing agent sprayer configured to spray a reducing agent in the mixing chamber, said reducing agent sprayer comprising at least one first nozzle and at least one second nozzle, wherein said at least one first nozzle is designed to produce small droplets, having a Sauter mean diameter of between 10 and 30 μm, and said at least one second nozzle is designed to produce large droplets, having a Sauter mean diameter of between 40 and 70 μm;

where said at least one first nozzle is primarily used when energy of the exhaust gas is low and said at least one second nozzle is primarily used when the energy of the exhaust gas is high, and where a low energy corresponds to a temperature of between 180° C. and 300° C. and a high energy corresponds to a temperature of between 300° C. and 500° C.; and where said at least one first nozzle is used according to a decreasing function of energy of the exhaust gas and said at least one second nozzle is used according to an increasing function of the energy of the exhaust gas.

2. The exhaust gas post-treatment device according to claim 1, wherein exhaust gas exiting the internal combustion engine enters an inlet to the mixing chamber, mixes with the reducing agent, and exits the mixing chamber through an outlet.

3. The exhaust gas post-treatment device according to claim 2, including a catalytic device upstream of the inlet to the mixing chamber.

4. The exhaust gas post-treatment device according to claim 1, wherein the mixing chamber is delimited by a wall to provide an exhaust gas post-treatment device that is downstream of the internal combustion engine.

5. The exhaust gas post-treatment device according to claim 1, where said at least one first nozzle is located in a location of the mixing chamber that is more sensitive to deposit formation and said at least one second nozzle is located in a location of the mixing chamber that is less sensitive to deposit formation.

6. The exhaust gas post-treatment device according to claim 1, where said at least one first nozzle is located in a first zone of the mixing chamber and said at least one second nozzle is located in a second zone of the mixing chamber, the second zone being broader than the first zone.

7. The exhaust gas post-treatment device according to claim 1, where the small droplets have an average Sauter diameter equal to 20 μm, and/or the large droplets have an average Sauter diameter equal to 55 μm.

* * * * *